Sept. 22, 1970  E. C. ATWELL  3,529,865
FABRIC AND METHOD OF PRODUCING SAME
Original Filed Feb. 12, 1965  2 Sheets-Sheet 1
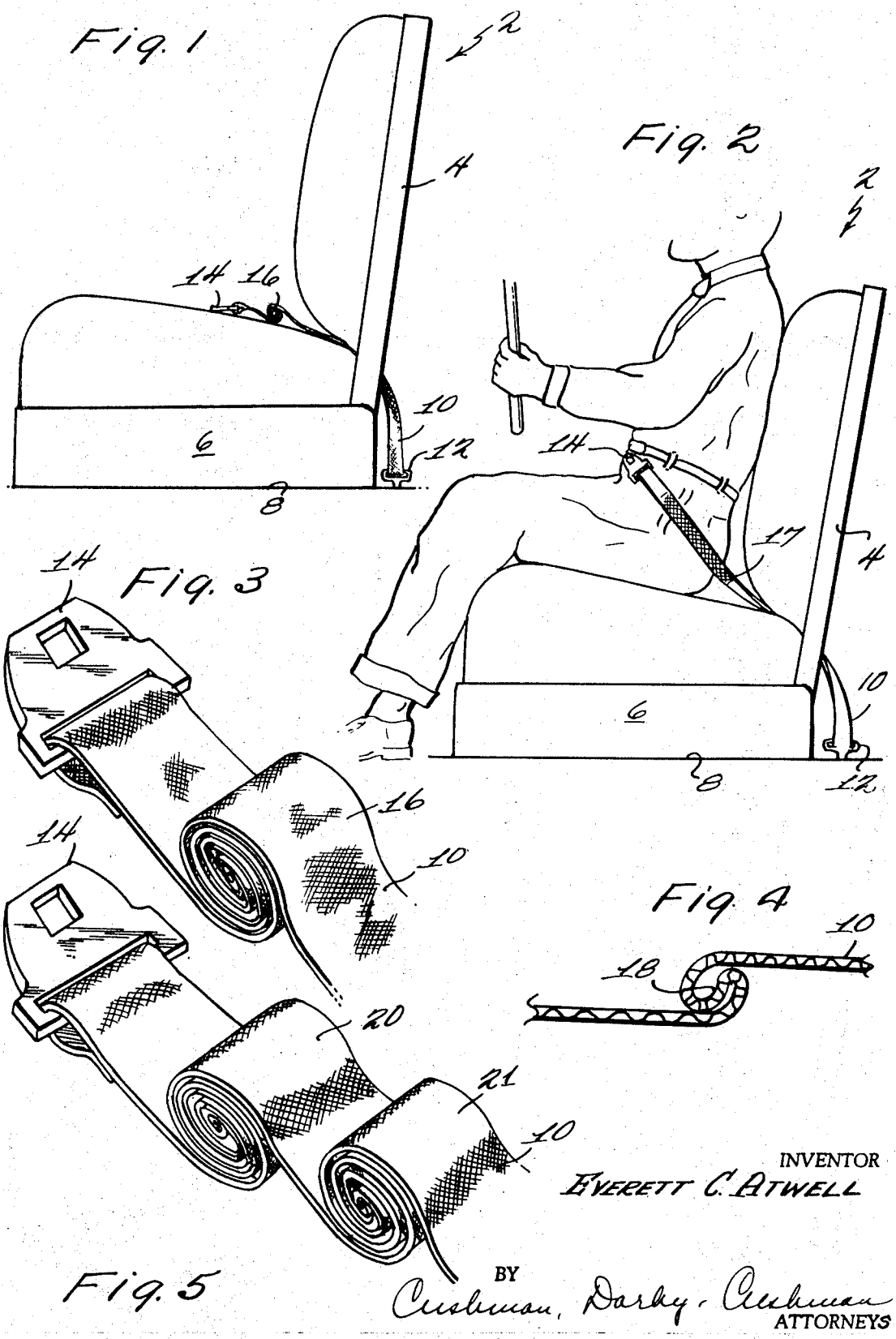
INVENTOR
EVERETT C. ATWELL
BY Cushman, Darby, Cushman
ATTORNEYS Sept. 22, 1970          E. C. ATWELL          3,529,865

FABRIC AND METHOD OF PRODUCING SAME

Original Filed Feb. 12, 1965          2 Sheets-Sheet 2

INVENTOR
EVERETT C. ATWELL

BY
Cushman, Darby & Cushman
ATTORNEYS

United States Patent Office 3,529,865
Patented Sept. 22, 1970

3,529,865
FABRIC AND METHOD OF PRODUCING SAME
Everett C. Atwell, Greensboro, N.C., assignor to Burlington Industries, Inc., Greensboro, N.C., a corporation of Delaware
Original application Feb. 12, 1965, Ser. No. 432,340. Divided and this application Oct. 2, 1967, Ser. No. 721,534
Int. Cl. A62b 35/00; B60r 21/10
U.S. Cl. 297—388   4 Claims

ABSTRACT OF THE DISCLOSURE

A self-retracting fabric comprising a woven web having a retracting coil therein, the woven web being composed of nylon and being impregnated with a material which is a thermoplastic resin, or thermosetting resin or a resin-forming agent which is fused and solidified, set or reacted to form resin within the web in the coiled form so that the coil is caused to retract by the action of the material after the web is extended and released.

---

This application is a division of copending application, Ser. No. 432,340, filed Feb. 12, 1965 now abandoned.

The present invention relates to certain improvements in self-retractable belts and webs, e.g. seat belts.

Considerable effort has been expanded in recent years towards developing self-retracting seat belts, i.e. belts which automatically withdraw into a convenient position ready for subsequent use when released by the user. This type of belt is becoming more and more important due to the increasing use of safety belts and the general inconvenience presented in locating the ends of conventional non-retractable belts.

Most prior proposals for retractable belts of the type indicated require the use of appropriate spring means or other relatively complex mechanical elements for the purpose or retracting the belt. The principal object of the present invention is to provide a belt structure which has a built-in coiling effect so that it retracts itself into a coiled, out-of-the-way position convenient for subsequent use without requiring mechanical winding or retracting means. A more specific object of the invention is the provision of a safety belt or the like which has a built-in coiling effect that is maintained over periods of long and sustained usage of the belt. Another object of the invention is to provide a method of preparing a retractable seat belt or the like of the type indicated above. Other objects will also be apparent from the following detailed description of the invention.

Broadly stated, the present invention contemplates (1) providing a belt or webbing, e.g. a woven safety belt fabric of conventional construction and consisting entirely or essentially of nylon; (2) impregnating the length or portion of the belt to be coiled with a treating solution wherein the essential component is a thermoplastic or thermosetting resin or a resin-forming agent which reacts with itself or the belt upon the application of heat to form a resin; (3) forming the thus impregnated length or portion into a tight coil; and (4) heating the coiled length to remove the solvent and fuse, react or form the resin within the belt whereby the belt is permanently coiled and acts more or less like a spring when it is extended and released.

The unique results of the invention are due, in large measure, to the application of a treating solution as defined above to the web, followed by the steps of solvent removal and fusion or heat reaction of the applied resin. Other possible alternatives for obtaining a built-in coiling effect in the belt suffer from one or more disadvantages which the present invention avoids. For example, a belt or web made up entirely of nylon cannot be effectively rendered self-retracting by heat setting the nylon in a coiled condition using heat alone. At the temperature required to heat set the nylon and produce the desired memory effect (380–440° F.) and using the time necessary to have the heat penetrate the coil or coils fully, the resulting product is useless because of (1) development of an undesirable brown discoloration on an undyed web, (2) destruction of dyestuff on dyed webbing as well as brown discoloration mentioned above, and (3) noticeable loss in breaking strength. To make the nylon web functional by means of dry heat setting alone, fibers which develop a set or memory at much lower temperatures, for example, polyester, Saran (polyvinylidene chloride) or rolled or twisted Mylar polyester strips, may be used but the introduction of these materials causes a lowering of breaking strength and raises the elongation as the result of excessive shrinkage in the heating step and it is not possible to obtain a product of optimum properties by heat setting alone, since the amount of these additional materials that can be introduced is limited by the need to meet the rigid physical test standards which have been set for safety belt webbing. Furthermore, the difference in shrinkage between nylon and the added material of lower softening temperature brings about an unbalanced force in the webbing which in turn causes the heat set coil to retract in a corkscrew condition instead of rolling up into the original coiled condition. This corkscrew condition completely defeats the purpose of a retractable seat belt and is therefore unsatisfactory. A warp content of about 20% or more of these lower softening fibers, ribbons or monofilaments is required in a heat set nylon webbing to bring about a satisfactory retractive force under conditions simulating usage. This percentage of dissimilar warp ends brings about the corkscrewing condition which therefore renders it impractical for commercial use.

It will be appreciated from the above that there are many difficulties in providing a self-retracting seat belt or web with a built-in coiling effect of the type indicated. However, the present invention offers a highly effective solution to these difficulties. For one thing, the invention makes it possible to avoid discoloration of the web and it is a particular advantage of the invention that the web may be processed as described after dyeing without appreciable change in appearance. Furthermore, the invention permits the use of webbing constructions with one hundred percent nylon content which have met consumer acceptance and which meet industry standards for automotive seat belt usage. Additionally, the treatment herein does not undesirably affect the strength of the belt and the self-retracting characteristics are maintained over long and extended periods of use. All of these characteristics make the belt of the present invention uniquely useful as a safety seat belt.

Effective materials for use herein in the treatment of the webbing are resins or resin-forming materials having a fusion or reaction temperature below the fusion temperature of the webbing. Typically, resins which melt or react or other materials which form resins that fuse or react at temperatures around 350° F. may be used for nylon webbing. The material employed as the treating agent should have good adhesion to nylon and/or other fibers used to make up the webbing and should provide the so treated webbing with satisfactory performance after repeated static and dynamic loading.

By following these specifications, the resin, whether applied directly or formed in situ, is either fused and then solidified by cooling if thermoplastic or cured if thermosetting, in the tightly coiled condition so that the treated web returns to this coiled condition following extension and release. This coiling effect is maintained despite repeated extension and release of the web. The same is true in the case where the web is pulled out and held in this position for a relatively long period of time. These are obviously important and essential characteristics for safety belt use. Furthermore, as indicated earlier, there is no noticeable discoloring or destruction of dyestuff by the solvent removal and resin fusing or reacting step.

While the invention may be used with webbing constructed entirely of nylon, the effect of the resin treatment may be further enhanced in some cases by the introduction of a low percentage (preferably less than 10%) of a low fusion fiber, e.g. a polyester monofil, without impairing color, strength or shrinkage and without creating an objectionable tendency to corkscrew upon repeated extension and retraction of the web.

It will be appreciated from the foregoing that the process of the present invention where the applied resin or resin-forming material is fused or caused to react or cure on the coiled webbing is basically different from conventional heat setting operations using, for example, hot water or steam, to set portions of a woven belt of nylon, polyethylene terephthalate or the like in a coiled self-retracting condition. In this connection, it might be noted that hot water setting of conventional nylon seat belting in a coiled form is ineffective since there is little, if any, resiliency in the resulting coils. The use of higher setting temperatures, using steam or dry heat, may increase the coil resiliency but such higher temperatures tend to discolor the webbing and introduce other undesirable characteristics as noted heretofore.

The solution of resinous or resin-forming material may be applied to the belt or webbing in any convenient fashion. Dipping, padding or the equivalent may be used for this purpose as long as the length of the webbing to be coiled is thoroughly impregnated with the treating solution. While the entire belt may be impregnated with the solution, it is preferable to apply the solution only to that portion of the belt to be coiled since this insures that the rest of the belt remains soft and avoids any problem in sewing on the buckle or locking components due to belt stiffness. This also makes it possible to impregnate the coiled portion with the necessary amount of resin solids to effect a satisfactory level of resiliency or retractability without altering the flexibility of the remainder of the belt.

Preferably, the length of the belt to be coiled is dipped in the treating solution or impregnating bath (e.g. a solution of alcohol/water-soluble polyamide such as Zytel 61) until thoroughly impregnated, then passed through nip rolls thereby furthering fuller penetration into the yarns making up the webbing and removing the excess solution from the surface of the belt. The thus impregnated belt length is then tightly coiled using clamps or pins to maintain the coil in the tight condition. Advantageously, the belt is held in its coiled condition by a perforated metal clamp which gives good heat transfer and permits evaporation of solvent through the perforations. In any event, the coiled section of the belt is placed in a heated oven or the like where the solvent is removed by evaporation and the solvent-free resin or resin-forming material is caused to fuse, cure or react after which the web is allowed to cool in the coiled condition. As indicated earlier, the heating step serves to fuse thermoplastic resin treatments and thereby promote improved bonding to the fibers. The same heating step serves to cure or cause reaction of the thermosetting types of finishes and simultaneously effects bonding to the fibers.

The amount of dry resin finish add-on is regulated by the concentration of resin or resin-forming solids in the treating solution and may be widely varied, depending upon the degree of resiliency desired, the construction of the webbing and the type of material applied. Useful concentrations of solids in the treating solution will usually fall within the range of 5% to 20% by weight. With a wet pickup ranging from 50% to 80% by weight of the webbing before treatment, it follows that the dry finish add-on will vary from 2.5% to 16% by weight.

As noted above, the treating solution or impregnating bath may advantageously comprise an alcohol-water solution of a polyamide such as Zytel 61, i.e. the reaction product of a diamine and dibasic acid wherein the amide chains contains reactive carboxyl and amine end groups. Typically, the solution comprises Zytel 61 dissolved in a mixture of 85 parts alcohol (ethanol) and 15 parts water. If desired, part or all of the soluble polyamide resin (Zytel 61), may be replaced by other resins such as polyurethanes, polyurethane prepolymers, epoxy, melamine or phenolic resins. As an alternative, the polyamide or other thermoplastic or thermosetting resin of the type indicated, may be replaced or modified by using one or more highly reactive resin-forming materials such as aliphatic and aromatic diisocyanates and other polyisocyanates. In short, any thermoplastic or thermosetting resin may be used which can be applied in a solvent that is inert to the webbing fibers and on drying and fusing or curing, as the case may be, develops a degree of resiliency and maintains a substantial portion of this resiliency after repeated extensions and retractions. From a purely aesthetic standpoint it is preferable that the resin be substantially without color, although this is not necessary.

As typical isocyanates for use herein, there may be mentioned polymethylene polyphenyl polyisocyanate having the formula:

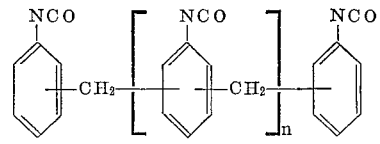

wherein $n$ is an integer, e.g. the product known as PAPI–1 (Carwin Company) in which $n$ has an average value of 1; Mobay's toluene diisocyanate polymer Mondur CB–60; triphenylmethane triisocyanate (Mondur TM); 3,3-dimethoxyl-4,4'-biphenylene diisocyanate; and p,p'-diphenylmethane diisocyanate (Mondur MO).

Removal of solvent and subsequent heating to cause fusing of thermoplastic type finishes or cross-linking of thermosetting and reactive type materials should be carried out for a time sufficient for the heat to penetrate to the core of the coil and at a temperature sufficiently high to accelerate the above effects. The maximum useful temperature is one that does not cause discoloration and does not lower the breaking strength/elongation characteristics below acceptable trade standards. At the time period required for heat to fully penetrate the coiled webbing, a temperature of about 375° F. on nylon webbing is considered maximum.

A safety belt according to the invention may be made up of two cooperating straps, each of which has one or more retractable coils therein according to the invention. On the other hand, it may be preferred to provide only one strap with a retracting coil or coils. For example, in the case of automobile safety belts, the strap nearest the door may be processed so that it coils up completely into one or more coils when not in use, while the other strap which cooperates therewith is of conventional form.

It will be appreciated that various types of woven constructions may be used for the web or belting of the invention. As noted earlier, however, one of the principal advantages of the present process is that it permits the use of conventional safety belt constructions rather than requiring some sort of special constructions. Typically, the construction may be a standard 2—2 pebble construction or 2—2 four way twill containing 840 denier nylon in the warp and filling. For example, one construction suitable for use herein is a 2—2 pebble construction woven with 244 ends of 840 denier producer twist nylon in the warp and either 1680 denier producer twist or 2 ply 840 denier nylon yarns (19 picks per inch) in the filling. The nylon might be of the type 6 or type 66. Another example of a belt or web suitable for treatment herein is a 2—2 four way twill woven with 244 ends of 2 ply 840 denier nylon (type 6) with 17 picks per inch of 3 ply 840 denier nylon in the filling. Other fabric constructions are described hereinafter.

The invention is illustrated, but not limited, by the following examples.

EXAMPLE 1

The webbing used in this example had the following construction:

1 15/16" 2 x 2 twill weave
Warp—214 ends of 2 ply 840 Enka nylon—2½S 72 ends of 20 mil monofil polyester (Dacron)
Fill—14¾ picks of 2 ply 840 Enka nylon—2½S Approximately 10 inches of the above webbing was immersed in an 8% solution of Zytel 61 (dissolved in 85% ethyl alcohol, 15% water). Wet pickup amounted to about 50% of the weight of the webbing before treatment. The webbing was then passed between a pair of nip rolls which squeezed off the excess resin solution. The 10" section was then tightly wound on a 5/16" mandrel into a coil about 1¼" diameter and clamped in this condition by means of a perforated metal clamp. The resulting assembly was heated at 375° F. for 30 minutes at which time the solvent was removed, and the resin, as introduced or formed by heating, was firmly bonded to the fibers. At the end of the heating period, the assembly was removed from the oven and allowed to cool. The coil was then removed from the clamp. The coil diameter at this point was about the same as when entered into the oven.

With one end fixed, the webbing was uncoiled by pulling the other end as far as it would go. The portion constituting the coil measured about 8¾" showing that a little shrinkage had occurred during the heating step. Upon release, the webbing retracted immediately into its coiled form.

To perform satisfactorily in usage the force required to extend a seat belt for buckling should not be so high as to become uncomfortable to the wearer. However, after several hours of extension, a sufficient force or resiliency should remain to effect immediate and full retractability of the attached buckle. Furthermore, the belt should be capable of repeating this performance over a period of several years. Additionally, of course, the belt must meet the minimum industry standards for strength/elongation characteristics. A rapid evaluation of these properties can be made through the use of an Instron strain gauge tester wherein the ends of the coil are mounted in the jaws of the tester. As the jaws separate the force required to pull the coil out is recorded graphically on a chart. Then the jaws are returned to the original or starting position and the retractable force remaining is recorded. A second test involves loading the coil with a static load of five pounds for a period of two hours, removing the load and within a five minute period placing the ends of the coil in the jaws of the Instron tester and repeating the test as above. A third test involves a dynamic loading test wherein the five pound load is applied and released repetitively at the rate of 45 cycles per minute for a total of 10,000 cycles. Five minutes after completion of this test the coil is again mounted on the Instron tester and the retractable force measured again.

The coiled webbing treated with Zytel 61 polyamide as above described required an initial force of 5.4 pounds to cause an extension of 7.5 inches, a force of 4.8 pounds after two hour static loading and 3.3 pounds after 10,000 cycles dynamic loading. Recovery periods of an hour or more permit these retractive forces to closely approach the original force of 5.4 pounds, although this is not necessary for satisfactory performance. This indicated that the coil retained its resilience and ability to return to essentially its original coiled state when released despite being (1) held for a relatively long period of time in the elongated state under a static load and (2) drawn out and released a very substantial number of times simulating conditions of use more rigorous than might normally be expected when used as a safety belt. This shows that the coiled webbing could be effectively used for seat belt purposes without significant loss in retractability even over long or frequent periods of use.

The example was repeated using 350° F. as the heating temperature with essentially equivalent results. The same was true when 6% Zytel was used followed by heating at 375° F. and 350° F., respectively. When the Zytel was omitted and the coil simply heat set at 350° F. in dry hot air for 30 minutes, the initial resilience was reduced by about 40% and there was substantial loss of resilience under static load and after flexing through 10,000 cycles. The heat-set only product could still be used for safety belt purposes but the chemically treated products were substantially superior.

EXAMPLE 2

The process of Example 1 was repeated using a 12% solution of Zytel, a temperature of 375° F. for 30 minutes for the heating step and a fabric of the following construction:

1 15/16" twill weave 5–1 body with 1 x 1 stuffer of .020" polyester (Dacron)
Warp—228 ends of 2 ply (840/140/½Z) 2½S 45 ends of .020 Dacron polyester
Filling—26.2 picks of 840/140/½Z Du Pont 702 nylon The resulting coiled product showed good initial resiliency and low loss of retractability on static loading and flexing. When the product was heat set only (400° F., dry hot air, 30 minutes), resiliency was reduced from 6.2 to 2.85 pounds.

Using the conditions of Example 1 above, except for the changes indicated below, the following examples also gave products demonstrating useful retractive properties:

EXAMPLE 3

Fabric—1 15/16" 2 x 2 twill weave
Warp—214 ends 2 ply 840 dr. Enka nylon-2½S 72 ends 20 mil monofil nylon type 0500
Fill—14¾ picks of 2 ply 840 dr. Enka nylon-2½S 6–12% Zytel solution heated at 350° F. for 30 minutes Heat setting (350–375° F. for 30 minutes in hot air) without the chemical treatment gave a product of much less desirable retraction properties.

EXAMPLE 4

Fabric—1 15/16" 2 x 2 twill weave
Warp—214 ends 2 ply 840 dr. Enka nylon-2½S 72 ends 20 mil monofil nylon, type 0200
Fill—10¾ picks of 2 ply 840 dr. Enka nylon-2½S 6–8 Zytel 61 solution heated at 350–375° F. for 30 minutes As in Example 3, less desirable results were obtained when the chemical treatment was replaced by heat setting in air at 350–375° F.

EXAMPLE 5

Fabric—1 15/16" width
Weave—twill 6–1 body with 1 x 1 stuffer of .020 Dacron polyester
Warp—221 ends of 2 ply (840/140/½Z) 2½S type 702 nylon 52 ends of .020" Dacron polyester monofil
Fill—30 picks 840/140/½Z type 702 nylon 12% Zytel 61 solution heated in air for 30 minutes In this particular case, fairly good results were also obtained by heat setting at 400° F. although the chemical treatment gave the best results.

EXAMPLE 6

Fabric—2 x 2 four way twill
Warp—255 ends of 2 ply (840/56/½Z) 2½S Enka nylon, type 6, 2 ends of 840/56/½ Enka nylon
Fill—15 picks of 2 ply (840/56/½Z) 2½S Enka nylon 8–12% Zytel 61 solution heated at 375° F. for 30 minutes

EXAMPLE 7

Fabric—2 x 2 four way twill
Warp—244 ends of 2 ply 840 dr. type 6 nylon
Fill—17 picks of 3 ply 840 dr. type 6 nylon 10–12% Zytel solution heated at 375° F. for 30 minutes

EXAMPLE 8

Fabric—1$^{15}$/$_{16}$" 2 x 2 twill weave
Warp—214 ends 2 ply 840 dr. Enka nylon-2½S 72 ends ½" rolled Mylar (polyester)
Fill—15¾ to 16¾ picks of 2 ply 840 dr.—2½S 6–8 Zytel 61 heated at 350–400° F. for 30 minutes or 220° F. for 1 hour

EXAMPLE 9

Fabric—1$^{15}$/$_{16}$" 2 x 2 twill weave
Warp—214 ends 2 ply 840 dr. Enka nylon-2½S 72 ends of 20 mil monofil polypropylene
Fill—14¾ picks of 2 ply 840 dr. Enka nylon-2½S 12% Zytel 61 heated at 300° F.

EXAMPLE 10

Fabric—1$^{15}$/$_{16}$" 2 x 2 twill weave
Warp—214 ends 2 ply 840 dr. Enka nylon-2½S turns 72 ends .013" x .030" Bolta Saran (acrylic) solution dyed
Fill—14 picks of 2 ply 840 dr. Enka nylon- 2½S turns 12% Zytel 61 heated in air at 325° F. for 30 minutes

EXAMPLE 11

Fabric—Same as that of Example 7 impregnated with 10% polymethylene polyphenylisocyanate in monochlorobenzene and isocyanate grade toluene heated at 350° F. for 30 minutes

EXAMPLE 12

Fabric—Same as that of Example 7 impregnated with 8.5% p,p-diphenylmethane diisocyanate in methylethyl ketone heated at 350° F. for 30 minutes The invention is further illustrated by the accompanying drawings wherein:

FIG. 1 is a fragmentary side elevation view of a vehicle seat equipped with a seat belt according to the invention, the belt strap being in the retracted position ready for use;

FIG. 2 is a side view as in FIG. 1 showing the strap in operative position;

FIG. 3 is a perspective view of a seat belt strap in the coiled position according to the invention;

FIG. 4 shows the member of FIG. 3 drawn out in its tensioned state;

FIG. 5 is a perspective view of another type of seat belt strap according to the invention wherein the strap includes two coils;

Figure 6:
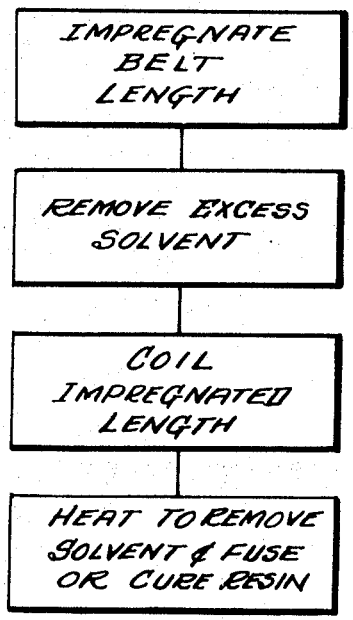
Figure 7:
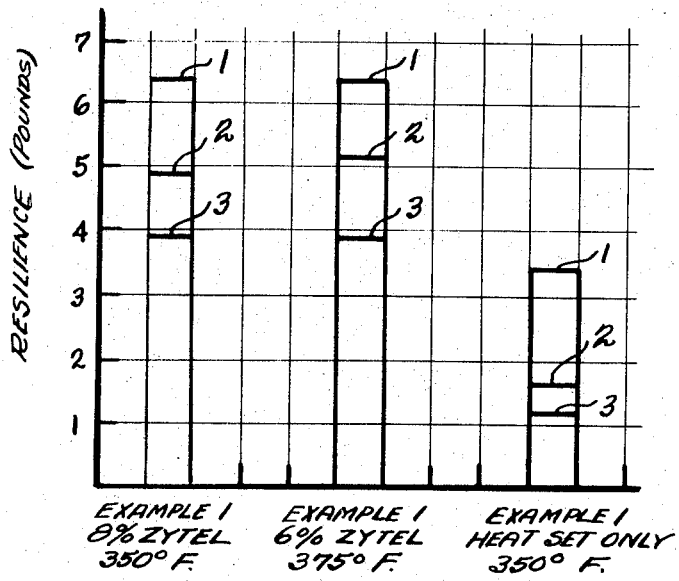

FIG. 6 diagrammatically shows one preferred method for carrying out the present invention, and FIG. 7 shows graphically the resilience results obtained using the indicated treatments.

Referring more particularly to the drawings, a seat 2 including a back 4 is shown in FIGS. 1 and 2. The seat may be the seat of any vehicle where a seat belt might be advantageously used. The seat is mounted in conventional fashion on a base 6 fixed to the vehicle floor 8.

One strap 10 of a seat belt according to the invention is fixed to appropriate holding or anchoring means 12, the strap then extending upwardly between the seat 2 and the bottom of back 4. Only one strap 10 is shown but it will be appreciated that there is another strap on the opposite side of the seat. These straps may be identical in length or one may be shorter than the other. Additionally, as noted earlier, each strap may be coiled or it may be adequate for just one of the straps to be self-coiling. In any event, the straps are provided at their ends with appropriate and conventional cooperating locking means 14 so that by pulling the ends together, the coil 16 is extended and the belt can be fixed around the waist of the rider as shown in FIG. 2. The shaded portion 17 of the extended strap 10 in FIG. 2 shows the part of the strap which normally makes up the coil 16 when the strap is in the released position of FIG. 1.

As will be appreciated, release of the locking means permits the strap 10 to snap back into the coiled position at the side of the seat as shown in FIG. 1, in a convenient position for subsequent use. By virtue of the unique process described herein, the resilience and recovery of the coils are maintained at a desirably high level even after repeated extensions and releases or long periods of time in which the belt is held in the extended uncoiled position.

FIG. 3 shows a preferred form of self-retracting safety belt strap according to the invention, the retracting coil 16 being formed with, for example, 4 or 5 relatively tight turns. FIG. 4 shows the strap in the extended condition with its characteristic "S" bend 18 which is not fully removed during extension. This bend is introduced into the belt as a result of the coiling operation.

In the embodiment of FIG. 5, the strap is provided with two adjacent coils 20 and 21 each somewhat smaller than the single coil 16 of the embodiment shown in FIGS. 1–4.

The flow sheet of FIG. 6 illustrates a preferred way of carrying out the present process for preparing the highly resilient and effective self-retracting coils of the invention. Thus, as shown, the appropriate length of webbing of desired construction and color, is dipped in the treating solution and excess solution is squeezed or otherwise removed therefrom. The thus treated length of webbing is then appropriately coiled as described heretofore and the coils are then heated to remove solvent and fuse or cure the resin. Various preferred operating conditions such as drying temperature, etc., have been outlined above and need not be discussed further at this point.

FIG. 7 shows graphically the resilience obtained with the various treatments as indicated. The horizontal lines designated by the numerals 1, 2, 3 represent, respectively, initial resilience of the coiled fabric, resilience after static loading test and resilient after dynamic loading test. The greater resilience of the products processed according to the invention, and particularly the higher percentage of resilience retained after the static and dynamic load tests is readily apparent from the graph.

It will be appreciated that various modifications may be made in the invention described herein without deviating from the scope thereof. Thus, while the invention has been described with respect to the provision of retractable seat belts for automobiles, airplanes or other vehicles, it will be understood that the inventive concepts described herein may be applied to types of web or belt members where retractability is a desired characteristic.

I claim:

1. A self-retracting fabric comprising a woven web having a retracting coil therein, said woven web being composed of nylon and being impregnated with a material which is a thermoplastic resin, or thermosetting resin or a resin-forming agent which is fused and solidified, set or reacted to form resin within the web in the coiled form so that said coil is caused to retract by the action of said material after said web is extended and released.

2. A self-retracting fabric according to claim 1 comprising a woven web having a retracting coil therein, said coil being rendered retracting by isocyanate heat-reacted throughout said coil.

3. A safety belt comprising a pair of cooperating woven webs at least one of which has the structure defined in claim 1, each of said webs being fixed at one end and adapted to lock with the other at the opposite end.

4. A self-retracting fabric according to claim 1 wherein said material is a thermoplastic resin impregnant.

References Cited
UNITED STATES PATENTS

| | | | |
|---|---|---|---|
| 3,243,232 | 3/1966 | Blaszkowski | 297—388 |
| 3,307,873 | 3/1967 | Blaszkowski | 297—388 |
| 3,321,245 | 5/1967 | Christen | 297—388 |
| 3,429,614 | 2/1969 | Huggins | 297—388 |

CASMIR A. NUNBERG, Primary Examiner

U.S. Cl. X.R.

264—137; 161—132